US012779902B2

(12) United States Patent
Kim et al.

(10) Patent No.: US 12,779,902 B2
(45) Date of Patent: Nov. 3, 2026

(54) WHEEL AND VEHICLE INCLUDING THE SAME

(71) Applicants: HYUNDAI MOTOR COMPANY, Seoul (KR); KIA CORPORATION, Seoul (KR)

(72) Inventors: Ju Ho Kim, Suwon-si (KR); Eun Sik Kim, Gwangmyeong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 231 days.

(21) Appl. No.: 18/668,409

(22) Filed: May 20, 2024

(65) Prior Publication Data

US 2025/0196531 A1 Jun. 19, 2025

(30) Foreign Application Priority Data

Dec. 13, 2023 (KR) ........................ 10-2023-0180556

(51) Int. Cl.
*B60B 19/00* (2006.01)
*B60B 3/10* (2006.01)

(52) U.S. Cl.
CPC ................ *B60B 19/00* (2013.01); *B60B 3/10* (2013.01); *B60B 2900/1216* (2013.01); *B60B 2900/513* (2013.01)

(58) Field of Classification Search
CPC .. B60B 19/00; B60B 3/00; B60B 3/10; B60B 2900/1216; B60B 2900/513; B60B 7/00; B60B 7/008; B60B 7/0086; B60B 7/01; B60B 7/04; B60B 7/20; B60B 1/00; B60B 5/00
See application file for complete search history.

(56) References Cited

U.S. PATENT DOCUMENTS

| | | | | |
|---|---|---|---|---|
| 4,593,953 | A | 6/1986 | Baba et al. | |
| 8,857,921 | B2 * | 10/2014 | Schmid | B60B 7/00 301/6.3 |
| 10,189,302 | B2 * | 1/2019 | Mayer Pujadas | B60B 7/0086 |
| 2018/0065407 | A1 * | 3/2018 | Heck | B60B 7/0086 |
| 2018/0281510 | A1 * | 10/2018 | Bach | B60B 7/18 |
| 2020/0331289 | A1 * | 10/2020 | Ravelo | B60B 7/0033 |
| 2024/0198724 | A1 * | 6/2024 | Jin | B60B 7/066 |

FOREIGN PATENT DOCUMENTS

| | | | | |
|---|---|---|---|---|
| DE | 10-2014-003394 | A1 | 9/2014 | |
| DE | 102019109601 | A1 * | 10/2019 | B60B 7/002 |
| KR | 10-2022-0016559 | A | 2/2022 | |
| KR | 20220016559 | A * | 2/2022 | B60B 7/04 |

OTHER PUBLICATIONS https://m.blog.naver.com/covis181001/222937867755.

* cited by examiner

*Primary Examiner* — S. Joseph Morano
*Assistant Examiner* — Taekwon Choi
(74) *Attorney, Agent, or Firm* — Morgan, Lewis & Bockius LLP

(57) ABSTRACT

A vehicle wheel includes a wheel disk including a hub to be coupled to an axle, a plurality of spokes extending radially from the hub, and a wheel rim provided on an outside of the spokes, an opening and closing member controlling opening and closing of openings formed between the spokes, and a driving unit coupled to and rotating the opening and closing member around the hub, wherein the driving unit includes a pushing portion providing a rotational driving force to the opening and closing member.

17 Claims, 11 Drawing Sheets

WHEEL AND VEHICLE INCLUDING THE SAME

CROSS-REFERENCE TO RELATED APPLICATION(S)

The present application claims priority to Korean Patent Application No. 10-2023-0180556 filed on Dec. 13, 2023, the entire contents of which is incorporated herein for all purposes by this reference.

BACKGROUND OF THE PRESENT DISCLOSURE

Field of the Present Disclosure

The present disclosure relates to a vehicle wheel and a vehicle including the same.

Description of Related Art

In general, the wheels of a vehicle are provided to be connected to an axle, and tires in contact with the ground are provided on the wheels. Wheels are important in terms of design, but they also have a major impact on aerodynamic performance and disc brake performance.

Meanwhile, to improve the fuel efficiency of vehicles, it is very important to reduce air resistance acting on vehicles traveling at high speed. It is known that the top/bottom shapes of vehicles contribute about 65% of air resistance, wheels/tires contribute about 25% of air resistance, and cooling resistance contributes about 10% of air resistance.

Many global vehicle manufacturers have been conducting research on the tops and bottoms of vehicles for decades and various air resistance improvement technologies have been developed and applied to actual mass-production. However, the development of air resistance improvement technology for wheels/tires that rotate at relatively high speeds has only recently progressed in full-scale.

A wheel includes a wheel rim and a wheel disk, and air resistance tends to be improved as openings between spokes of the wheel disk are blocked (i.e., as an aperture ratio decreases). However, if the aperture ratio is too low, air does not pass through easily, making it difficult to sufficiently cool heat generated by a brake disc, and thus, the aperture ratio cannot be lowered unconditionally to improve aerodynamics.

To improve this, technology has recently been developed which may satisfy both braking and aerodynamic performance by applying a device which may actively open or close the openings between the spokes.

However, the related art device for opening and closing the openings between spokes may be insufficient in terms of structure and efficiency, and furthermore, it may be difficult to install a driving device inside a wheel rotating at high speeds and it may be difficult to stably supply power to the driving device.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a structure of an opening and closing device which may efficiently open or close an opening between spokes with a simple structure.

The object of the present disclosure is not limited to the objects mentioned above, and other objects not mentioned will be clearly understood by those skilled in the art from the description below.

According to an aspect of the present disclosure, a vehicle wheel includes: a wheel disk including a hub to be coupled to an axle, a plurality of spokes extending radially from the hub, and a wheel rim provided on an outside of the spokes; an opening and closing member controlling opening and closing of openings formed between the spokes; and a driving unit coupled to and rotating the opening and closing member around the hub, wherein the driving unit includes a pushing portion providing a rotational driving force to the opening and closing member.

The opening and closing member may be driven to rotate around an axis the same as an axis of a rotation center of the hub.

The opening and closing member may include: a rotating ring rotatably mounted on the hub; and a plurality of rotating blades extending radially from the rotating ring.

The hub may include a cylindrical rotation guide so that the rotating ring is inserted into an external diameter of the cylindrical rotation guide.

At least one of the rotating blades may include a bent portion formed at an external end portion thereof in a radial direction.

The driving unit may include an elastic member returning the opening and closing member rotated by the pushing portion to an original position of the opening and closing member.

The pushing portion may include a pusher formed of a shape-memory alloy linked to the rotating blade to provide rotational driving force to the opening and closing member.

The driving unit may include an elastic member returning the opening and closing member rotated by the pushing portion to an original position of the opening and closing member.

At least one of the rotating blades may include a rotating rib extending in a radial direction, and one end portion of each of the pushing portion and the elastic member may be connected to any one of the rotating ribs.

The spoke may include a fixed rib to which the other end portions of the pushing portion and the elastic member are connected.

The rotating blades may be provided to correspond to a shape of the openings.

The rotating blades may include a greater circumferential width than the openings.

The rotating blades may include a bent portion at an external end portion thereof.

A circular reinforcing ring may be provided to connect external end portions of the rotating blades.

A bearing may be provided between the rotating ring and the hub.

According to another aspect of the present disclosure, a vehicle includes: a body; and the vehicle wheel according to an exemplary embodiment of the present disclosure provided to enable the body to travel.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
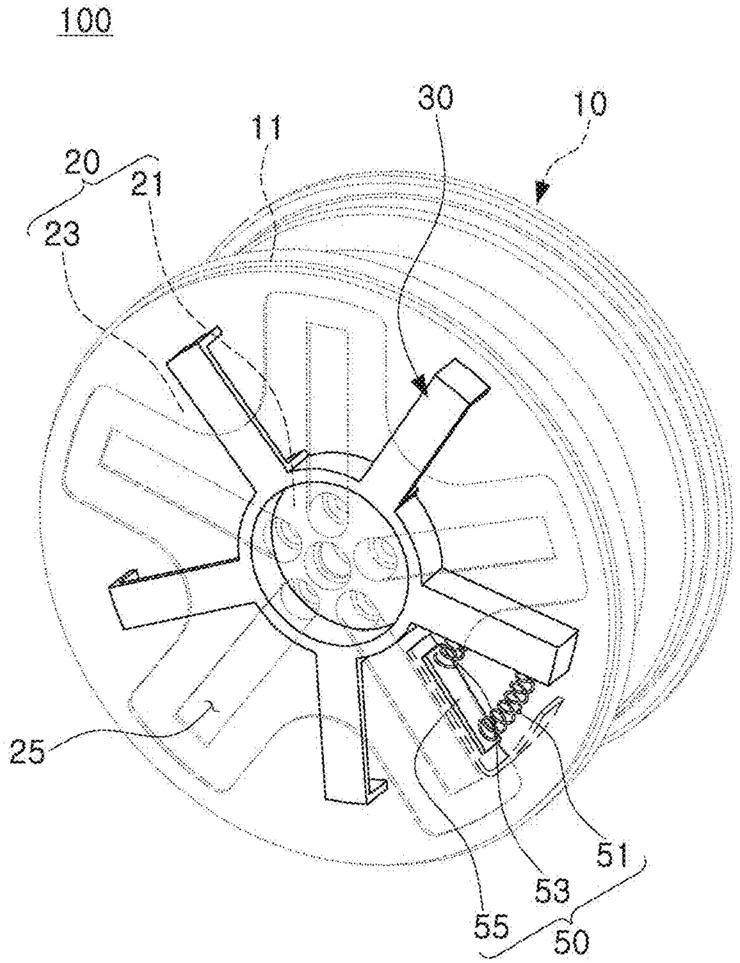
FIG. 1 and FIG. 2 are perspective views exemplarily illustrating a vehicle wheel according to an exemplary embodiment of the present disclosure, viewed from the outside thereof (FIG. 1 with an opening open, FIG. 2 with the opening closed)

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

While the present disclosure may be modified in various ways and take on various alternative forms, specific embodiments thereof are illustrated in the drawings and described in detail below. However, it should be understood that there is no intent to limit the present disclosure to the particular forms disclosed, but on the contrary, the present disclosure covers all modifications, equivalents, and alternatives falling within the spirit and scope of the present disclosure.

It will be understood that, although the terms "first," "second," etc. may be used herein to describe various elements, these elements should not be limited by these terms. These terms are only used to distinguish one element from another. For example, a first element could be termed a second element, and a second element could similarly be termed a first element without departing from the scope of the present disclosure. As used herein, the term "and/or" includes any and all combinations of one or more of the associated listed items.

The terms, such as "unit, part, portion, etc." may be used to describe various components, but the components should not be limited by these terms. The above terms may refer to not only physically/visually distinct components, but also to functions or components of a portion even if the corresponding portion is not clearly divided.

The terms used herein to describe embodiments of the present disclosure is not intended to limit the scope of the present disclosure. The articles "a," and "an" are singular in that they have a single referent, however the use of the singular form in the present specification should not preclude the presence of more than one referent. In other words, elements of the present disclosure referred to in the singular may number one or more, unless the context clearly indicates otherwise. It will be further understood that the terms "comprise," "comprising," "include," and/or "including," when used herein, specify the presence of stated features, numbers, steps, operations, elements, and/or components but do not preclude the presence or addition of one or more other features, numbers, steps, operations, elements, components, and/or groups thereof.

Unless defined in a different way, all the terms used herein including technical and scientific terms have the same meanings as understood by those skilled in the art to which the present disclosure pertains. Such terms as defined in generally used dictionaries should be construed to have the same meanings as those of the contexts of the related art, and unless clearly defined in the application, they should not be construed to have ideally or excessively formal meanings.

In the present specification, vehicles refer to a variety of vehicles that move transported objects, such as people, animals, or goods, from a starting point to a destination. These vehicles are not limited to vehicles that run on roads or tracks. Furthermore, vehicles include not only those that use fossil fuels, such as gasoline, but also those that use electricity stored in batteries or the like and those that use future fuels, such as hydrogen.

In the description below, the terms "anterior," "posterior," "lateral," "front," "rear," "up/down," "above," "upper," "top," "below" "lower" "bottom" "left/right" and the like are defined based on a vehicle or vehicle body. Furthermore, terms, such as first and second may be used to describe various components, but these components are not limited in order, size, location, or importance by terms, such as first and second and named for the sole purpose of distinguishing one component from another.

Hereinafter, various exemplary embodiments of the present disclosure will be described in detail with reference to the accompanying drawings.

Figure 2:
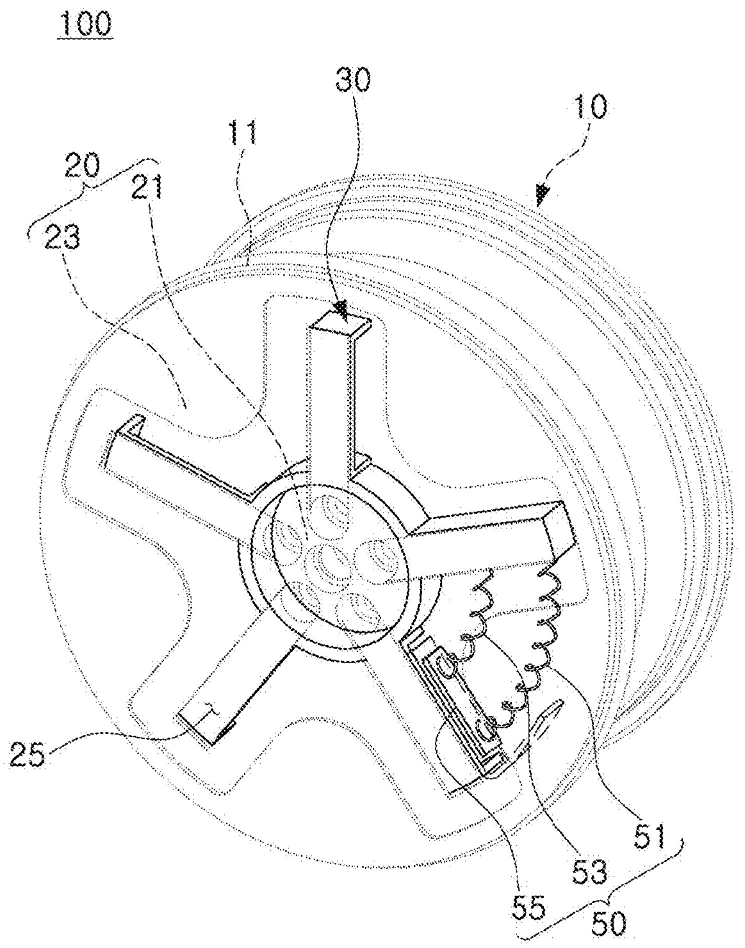
Figure 3:
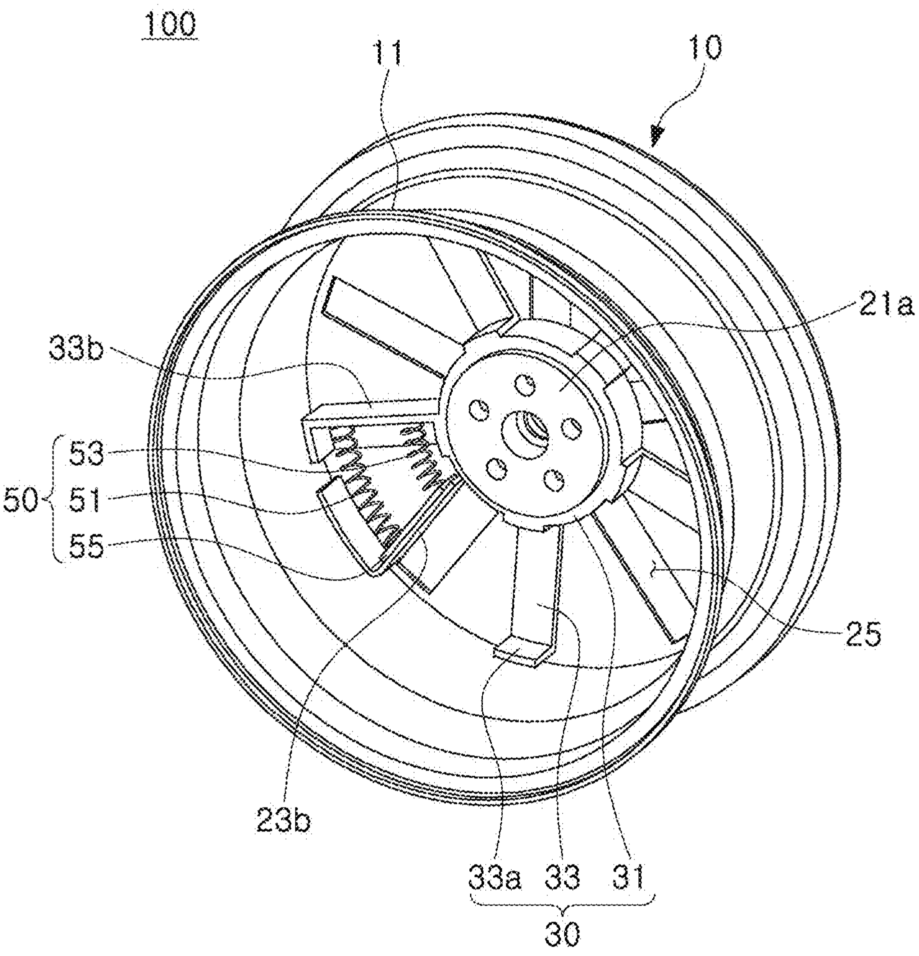
FIG. 3 and FIG. 4 are perspective views exemplarily illustrating a vehicle wheel according to an exemplary embodiment of the present disclosure, viewed from the inside (FIG. 3 with the opening open, FIG. 4 with the opening closed)
Figure 4:
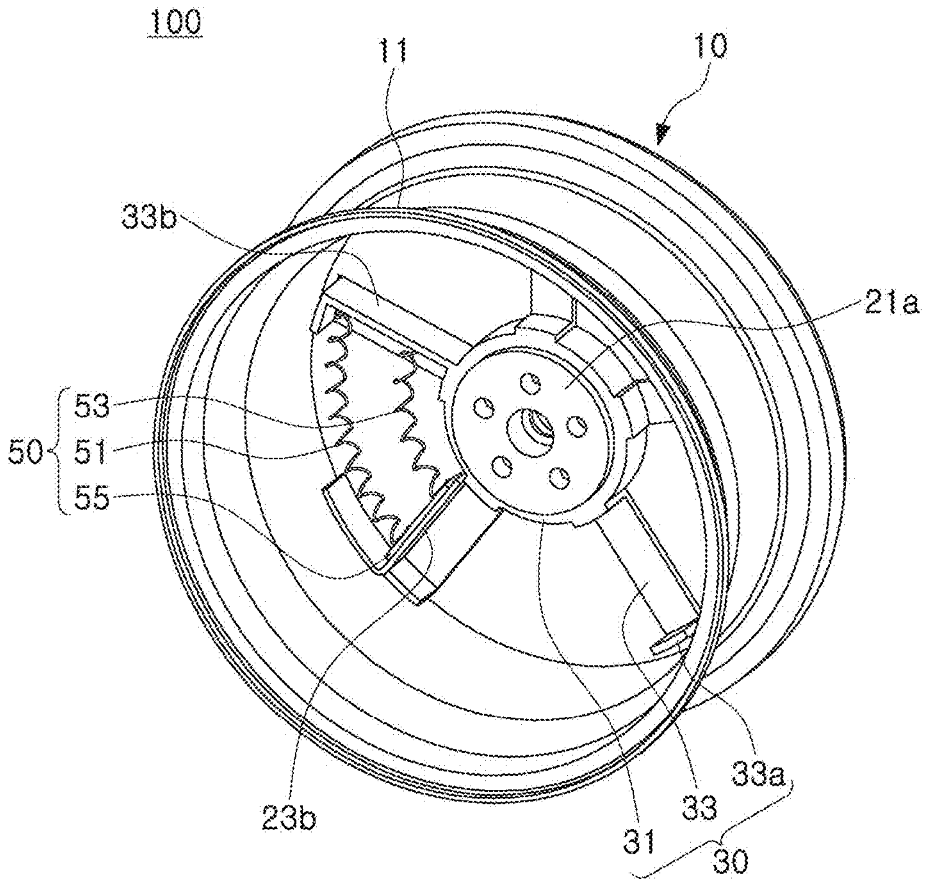
Figure 5:
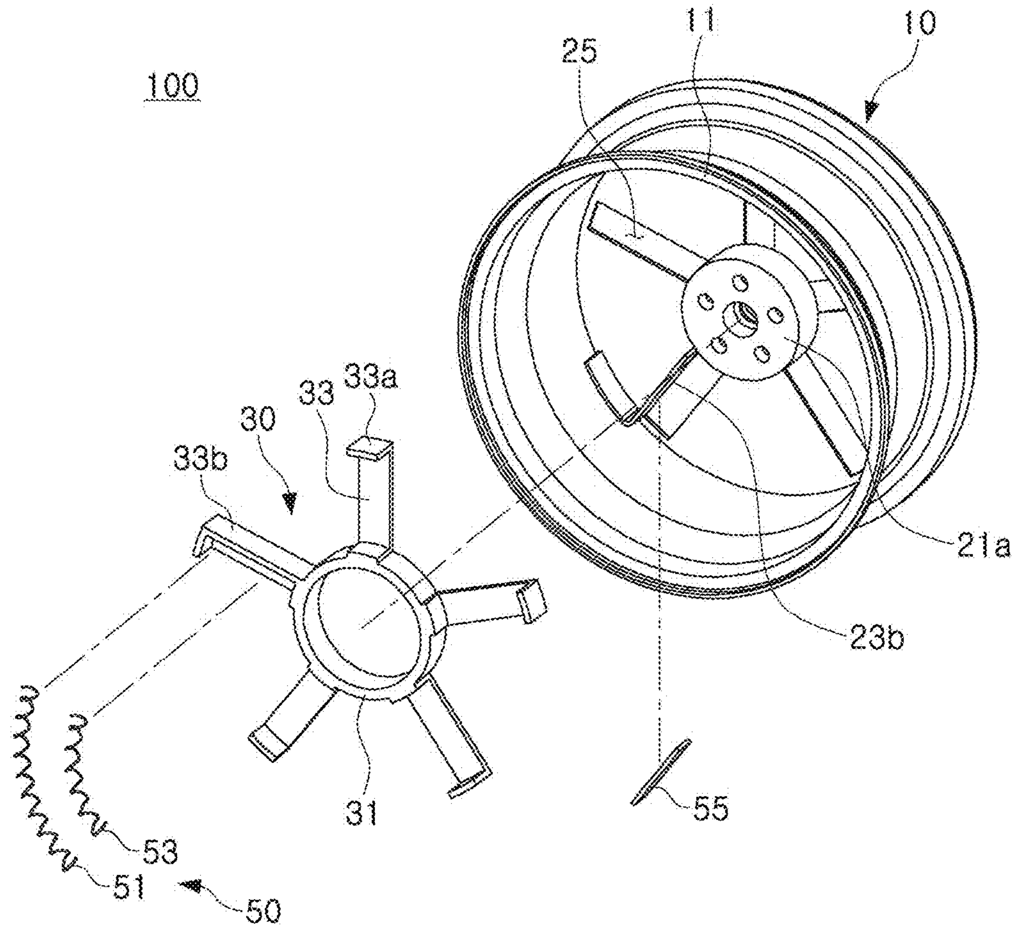
FIG. 5 is an exploded perspective view of a vehicle wheel according to an exemplary embodiment of the present disclosure.
Figure 6:
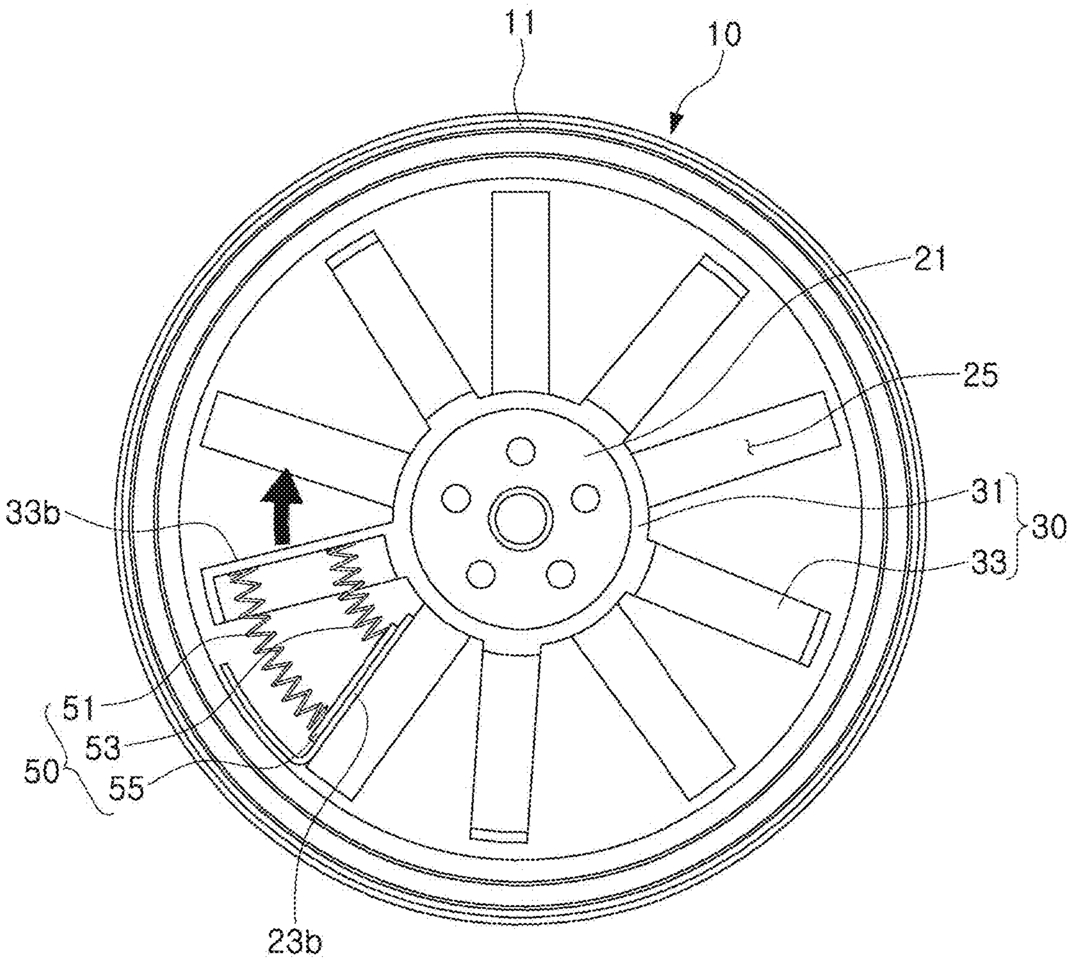
FIG. 6 and FIG. 7 are front views of a vehicle wheel according to an exemplary embodiment of the present disclosure, viewed from the inside (FIG. 6 with the opening open, FIG. 7 with the opening closed)
Figure 7:
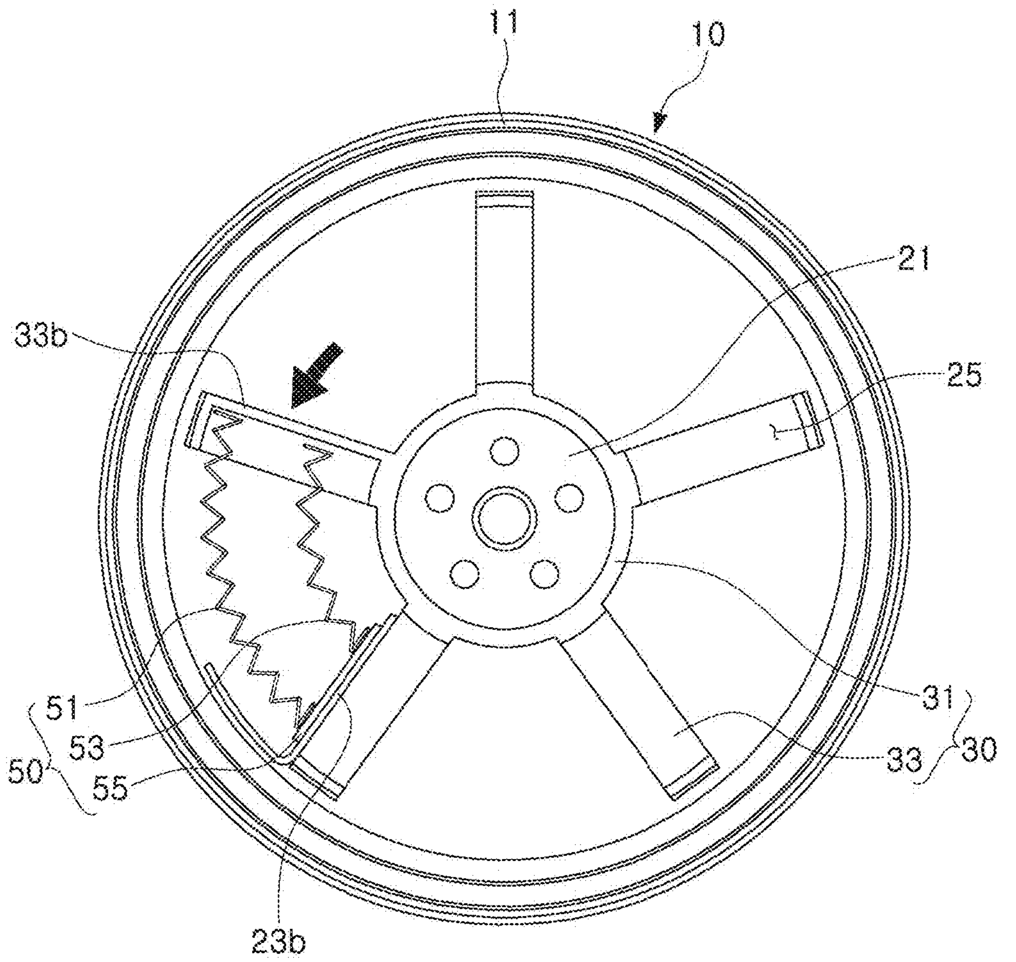

FIG. 1 and FIG. 2 are perspective views exemplarily illustrating a vehicle wheel according to an exemplary embodiment of the present disclosure, viewed from the outside thereof (FIG. 1 with an opening open, FIG. 2 with the opening closed).

Referring to FIG. 1 and FIG. 2, a vehicle wheel 100 according to an exemplary embodiment of the present disclosure may be connected to an axle of a vehicle, and may be applied to, for example, a wheel/tire assembly of a passenger vehicle. The wheel 100 may include a wheel rim 10 and a wheel disk 20.

The wheel rim 10 is a portion on which a tire (not shown in the drawing) is mounted, and has rim flanges 11 on both sides thereof in a width direction of the vehicle. The wheel disk 20 may include a hub 21 coupled to the axle on an internal center side of the wheel rim 10 and a plurality of spokes 23 radially connecting the hub 21 to the rim flange 11.

Here, the wheel disk 20 forms openings 25 including a set area between the spokes 23, and the spokes 23 may have a width which is constant, gradually decreases, or gradually increases from the rim flange 11 side toward the hub 21. Accordingly, the opening 25 may include a constant width or may include a width gradually narrowing from the rim flange 11 toward the hub 21. In the drawings of the exemplary embodiment, only the opening 25 including a constant width is illustrated for convenience of illustration, but the shape of the opening 25 is not limited thereto.

Because the basic configuration of the wheel rim 10 and the wheel disk 20 is a known technology widely known to those skilled in the art, a detailed description of the configuration will be omitted in the present specification.

The vehicle wheel 100 according to an exemplary embodiment of the present disclosure includes a structure in which the area of the openings 25 between the spokes 23 may be variably adjusted by rotation of an opening and closing member 30.

Referring to FIGS. 1 to 7, the vehicle wheel 100 of an exemplary embodiment of the present disclosure may include the opening and closing member 30 rotatable about the hub 21 to open or close each opening 25.

The opening and closing member 30 of the exemplary embodiment may be provided in the wheel disk 20.

The wheel disk 20 may include the hub 21 to be coupled to the axle of the vehicle and a plurality of spokes 23 extending radially from the hub 21 and may include a rim flange 11 provided on the outside of the spokes 23.

The opening and closing member 30 may control the opening and closing of the openings 25 provided between the spokes 23. The opening and closing member 30 may be driven by rotation around the hub 21. In detail, the opening and closing member 30 may rotate around the axle on which the hub 21 is provided in the vehicle.

The opening and closing member 30 may include a rotating ring 31 rotatably mounted on the hub 21 and a plurality of rotating blades 33 extending radially from the rotating ring 31.

The rotating ring 31 may be provided in an annular shape so that it may be inserted into the hub 21 and rotated. Furthermore, the hub 21 may include a cylindrical rotation guide 21*a* that protrudes into the inside of the wheel so that the rotating ring 31 is fitted into an external diameter thereof.

The plurality of rotating blades 33 may be provided to extend in a radial direction from the rotating ring 31. In detail, the plurality of rotating blades 33 may extend long in the radial direction from the outside of the rotating ring 31 and may include a shape corresponding to the shape of the openings 25 to close the openings 25 by rotation thereof.

In an exemplary embodiment of the present disclosure, the openings 25 are illustrated to include a slit shape with a constant diameter, but the openings 25 are not limited thereto and may be provided in various shapes, such as changing diameters. Accordingly, the rotating blades 33 opening and closing the openings 25 may also be provided in the shape of a slit including a constant diameter or a shape including a diameter changing to correspond to the shape of the openings 25. Furthermore, the rotating blades 33 of the exemplary embodiment may include a larger width (diameter) than the openings 25 to facilitate closing the openings 25. That is, a circumferential width of the rotating blades 33 may be greater than the circumferential width of the openings 25.

Meanwhile, the rotating blades 33 may include a bent portion 33*a* bent at an external end portion thereof in the radial direction. The bent portion 33*a* may supplement rigidity.

The bent portion 33*a* is bent in a circumferential direction of the wheel rim 10.

The opening and closing member 30 of the exemplary embodiment may be driven by a driving unit 50. The driving unit 50 may apply rotation force so that the opening and closing member 30 rotates around the hub 21. Furthermore, since the rotating ring 31 is rotatably inserted into the hub 21, the driving unit 50 may be a device applying force to push the rotating blades 33 in the circumferential direction to cause the rotating ring 31 to rotate about the hub 21 or applying rotation force to the rotating ring 31.

That is, the driving unit 50 may be a pusher (forming a pushing force) and a puller (forming a pulling force) that push the rotating blades 33 in the circumferential direction, and may have various structures, such as a linear motor, hydraulic compressor, or air compressor. Of course, the driving unit 50 may be a rotation motor rotating the rotating ring 31 or the like.

In an exemplary embodiment of the present disclosure, as a representative example of the driving unit 50, a pushing portion 51 formed of a shape-memory alloy may be used as a pusher, and an elastic member 53, for example, a spring or the like, pulling the rotated blades 33 to their original positions may be used as a puller. Of course, on the other hand, the pusher may be an elastic member and the puller may be formed of a shape-memory alloy material.

Since the elastic member 53 is sufficient to return the rotating blades 33 to their original positions, the elastic member 53 is not limited to springs, and various structures, such as hydraulic dampers, may be applied.

That is, in an exemplary embodiment of the present disclosure, the driving unit 50 may include the pushing portion 51 formed of a shape-memory alloy material providing a rotational driving force to the opening and closing member 30 and the elastic member 53 returning the opening and closing member 30 rotated by the pushing portion 51 to its original position. Both the rotating ring 31 and the rotating blades 33 may rotate by driving the driving unit 50.

The pushing portion 51 may be linked to at least one of the rotating blades 33 to provide rotational driving force to the opening and closing member 30.

At least one of the rotating blades 33 may include a rotating rib 33*b* extending in the radial direction, and one end portion of each of the pushing portion 51 and the elastic member 53 may be connected to at least one of the rotating ribs 33*b*. Furthermore, the spoke 23 of the wheel may include a fixed rib 23*b* to which the other end portions of the pushing portion 51 and the elastic member 53 are connected.

The fixed rib 23*b* may be provided with a control board 55 controlling the pushing portion 51 formed of a shape-memory alloy. The control board (components, such as a printed circuit board (PCB), flexible PCB (FPCB), and the like may be variously applied) may be provided with a power source connected to the outside and wired and wireless control lines.

The driving unit 50 may be configured for controlling the pushing portion 51 formed of a shape-memory alloy material by providing electric power to increase the length thereof, and accordingly the opening and closing member 30 may rotate to block the opening 25. The electric power is controlled by the control board 55. Furthermore, when force applied to the pushing portion 51 is removed by controlling the pushing portion 51 formed of a shape-memory alloy material, the opening and closing member 30 may rotate to be returned to its original position due to a restoring force (elastic force) of the elastic member 53 and the opening 25 may be opened again.

In the drawing illustrating the exemplary embodiment, the pushing portion 51 and the elastic member 53 may be provided in a curved round shape, and although not illustrated in the drawing, a guide guiding to a tension and compression path of the pushing portion 51 and the elastic member 53 may be separately provided. Furthermore, although not illustrated in the drawing, the pushing portion 51 and the elastic member 53 may be provided in a straight shape, and both end portions or at least a portion in which the pushing portion 51 and the elastic member 53 are fixed may be provided to include the degree of freedom of rotation.

Figure 8:
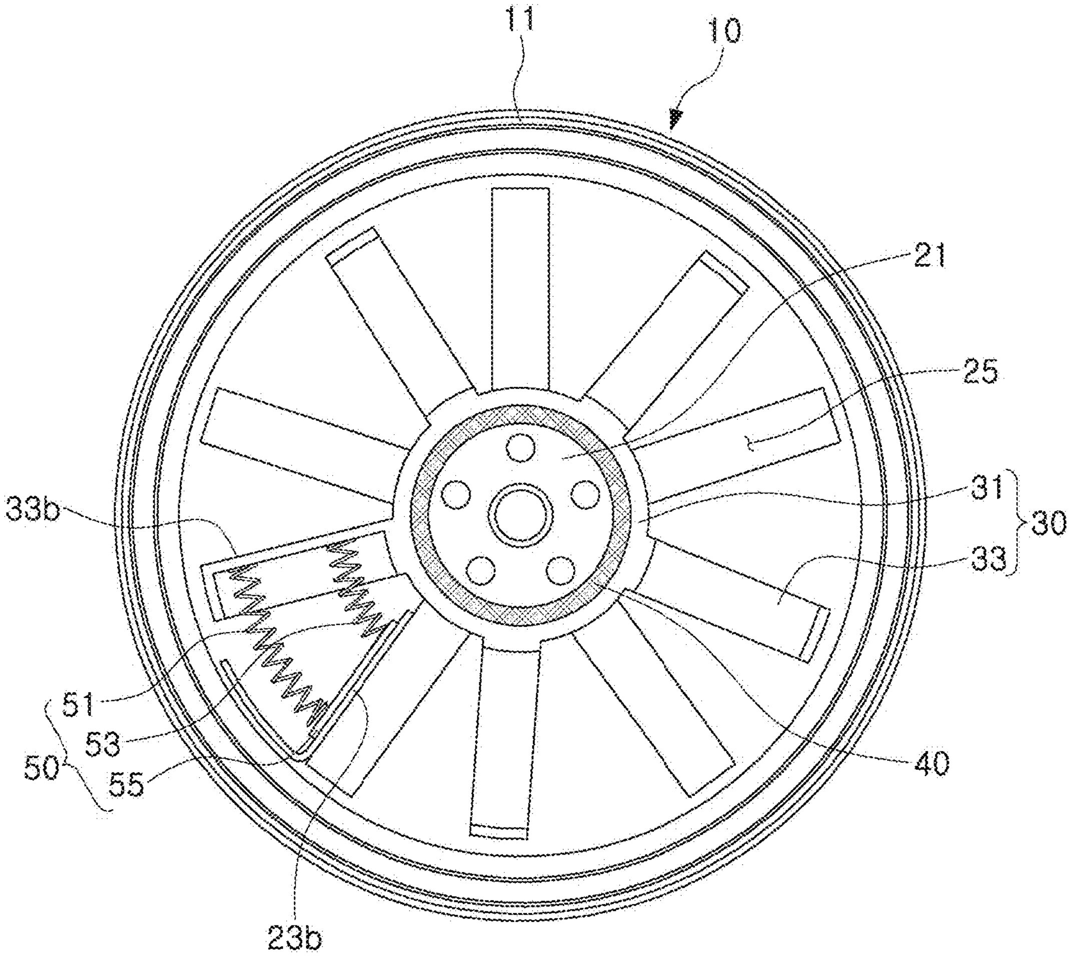
FIG. 8 illustrates another example of a vehicle wheel according to an exemplary embodiment of the present disclosure.

Meanwhile, as illustrated in FIG. 8, a bearing 40 may be provided between the rotating ring 31 and the hub 21 to facilitate rotation of the rotating ring 31, while the rotating ring 31 is inserted into the hub 21.

Figure 9:
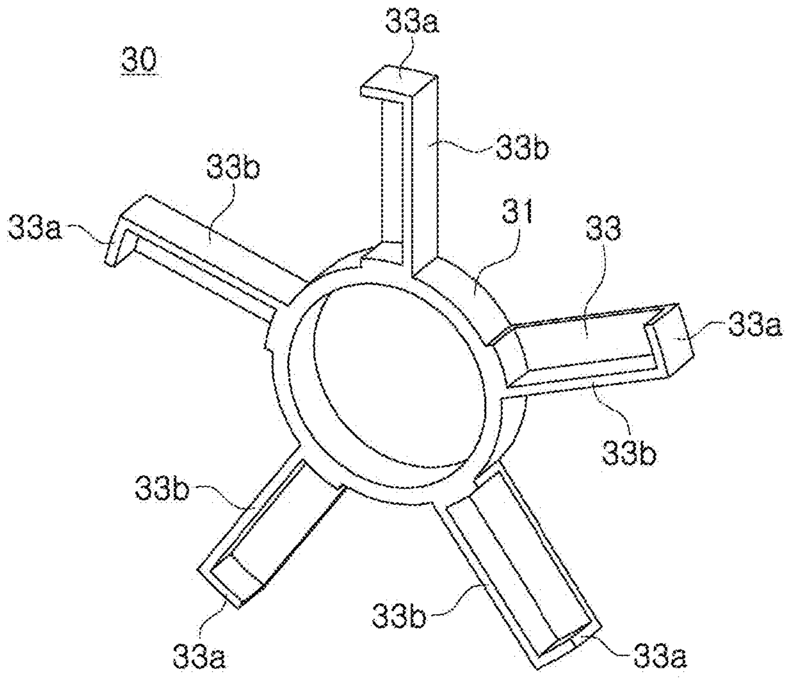
FIG. 9, FIG. 10 and FIG. 11 are perspective views of an opening and closing member according to another exemplary embodiment of the present disclosure.

Furthermore, as illustrated in FIG. 9, the rotating ribs 33*b* may be provided on all of the rotating blades 33 to supplement rigidity.

Figure 10:
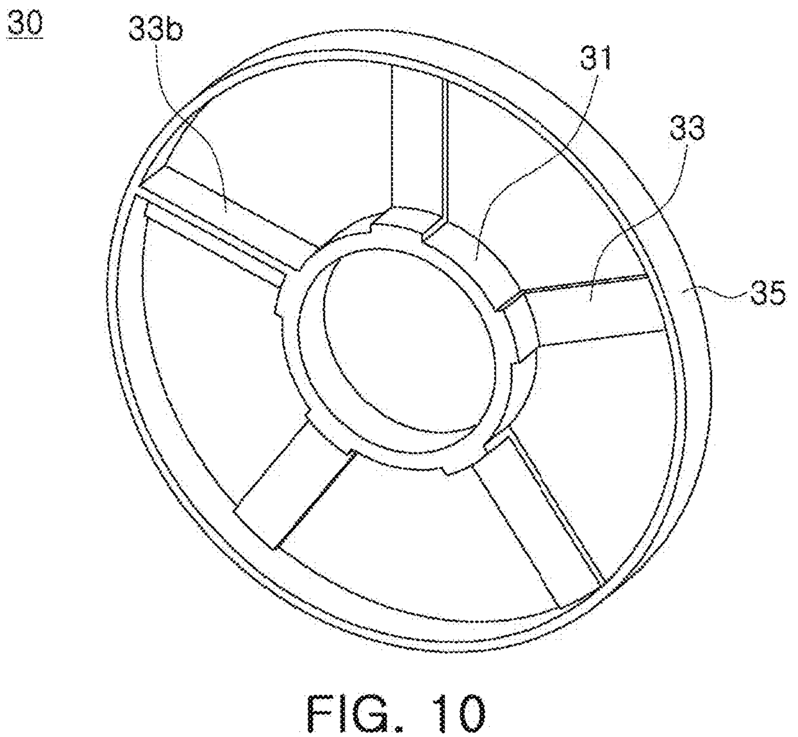

Furthermore, as illustrated in FIG. 10, a circular reinforcing ring 35 connecting external end portions of the rotating blades 33 may be provided in place of the bent portion 33*a* in an exemplary embodiment of the present disclosure to supplement rigidity.

Figure 11:
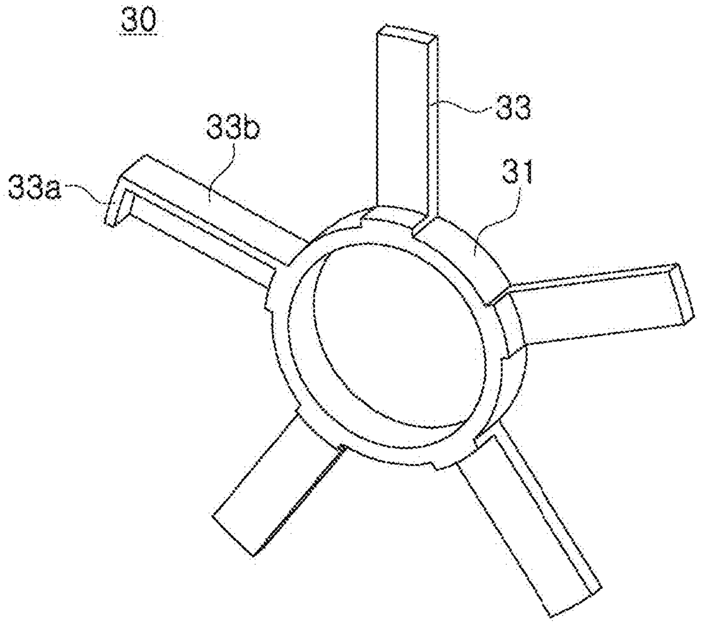

Furthermore, as illustrated in FIG. 11, in an exemplary embodiment of the present disclosure, a thickness or width of the rotating blades 33 may be increased to improve rigidity, without a bent portion. However, even in the instant case, the blade 33 including the rotating rib 33*b* to which the pushing portion 51 is connected may include the bent portion 33*a*.

Figure 12:
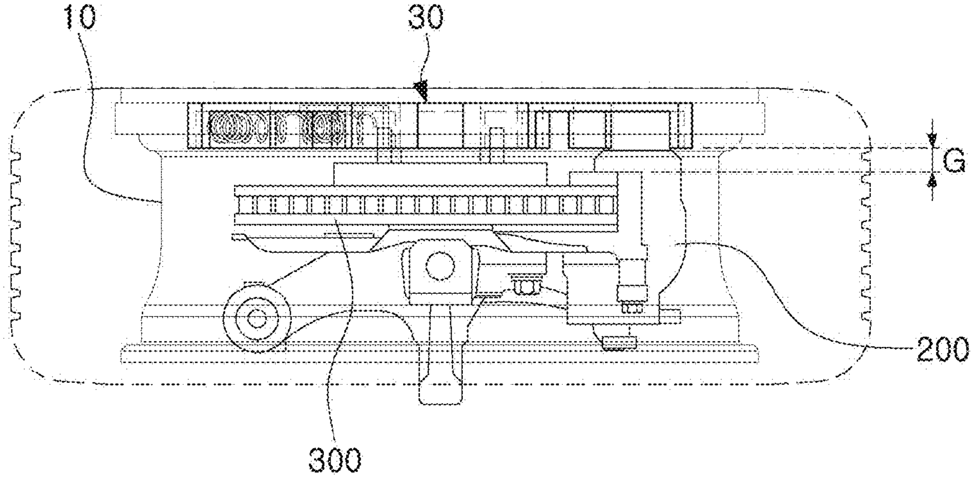
FIG. 12 is a reference diagram illustrating a configuration in which a caliper and a brake disc are provided on a vehicle wheel according to an exemplary embodiment of the present disclosure.

Meanwhile, as illustrated in FIG. 12, when the vehicle wheel 100 of the exemplary embodiment of the present disclosure is provided in a vehicle, a caliper 200 and a brake disc 300 are provided adjacent to each other, so a sufficient gap G may be provided so that the caliper 200 and the brake disc 300 are not interfered with by rotation of the opening and closing member 30 provided on the vehicle wheel 100. Because the caliper 200 may protrude further toward the opening and closing member 30, special attention may be paid to structural design to sufficiently maintain the gap G.

Figure 13:
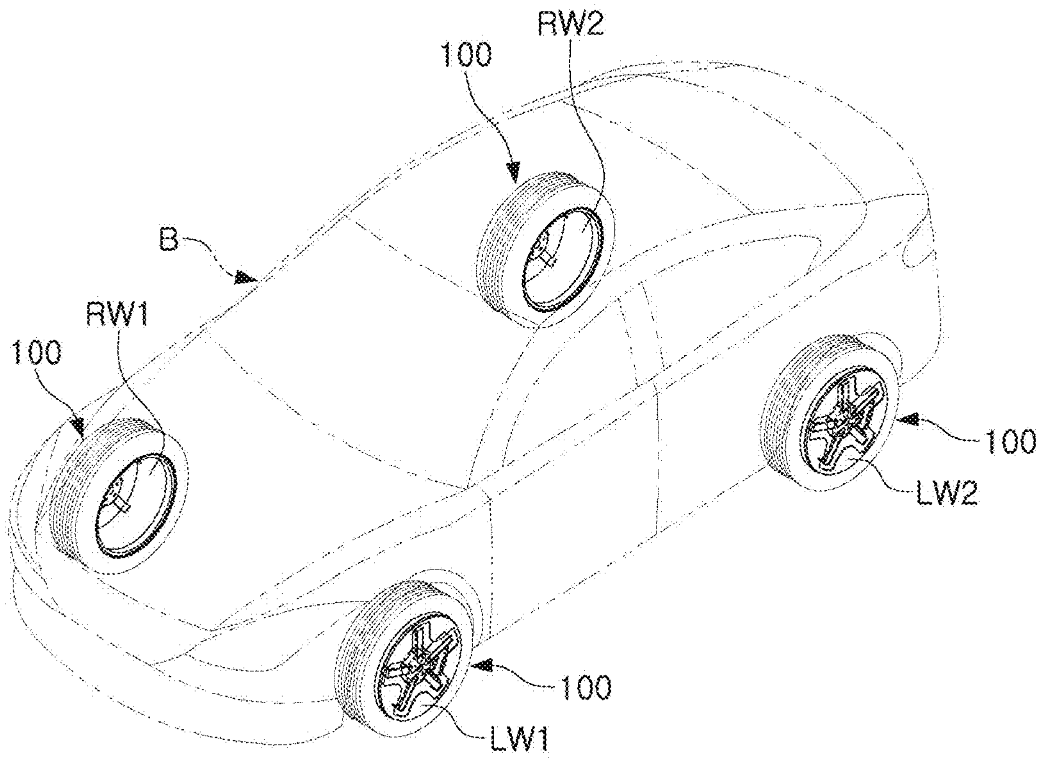
FIG. 13 is a reference diagram illustrating a vehicle to which a vehicle wheel according to an exemplary embodiment of the present disclosure is applied.

FIG. 13 is a reference diagram illustrating a vehicle on which the vehicle wheel 100 is provided according to an exemplary embodiment of the present disclosure.

A vehicle according to an exemplary embodiment of the present disclosure includes at least a body B, left wheels LW1 and LW2 (LW), and right wheels RW1 and RW2 (RW) provided on the body B. Furthermore, the vehicle of the exemplary embodiment may include the wheel 100 including the opening and closing member 30 configured for opening and closing the opening 25 to facilitate cooling of the brake disc while driving.

The vehicle wheel according to an exemplary embodiment of the present disclosure may easily open or close the openings between the spokes using an opening and closing device including a simple structure, improving the aerodynamic performance and fuel efficiency of vehicles.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle wheel comprising:

a wheel disk including a hub, a plurality of spokes extending radially from the hub, and a wheel rim provided on an outside of the spokes;

an opening and closing member controlling opening and closing of openings formed between the spokes; and a driving unit coupled to and rotating the opening and closing member around the hub, wherein the driving unit includes a pushing portion providing a rotational driving force to the opening and closing member, wherein the opening and closing member includes a rotating ring rotatably mounted on the hub and a plurality of rotating blades extending radially from the rotating ring, and wherein the rotating blades include a bent portion at an external end portion thereof.

2. The vehicle wheel of claim 1, wherein the opening and closing member is driven to rotate around the axis of rotation of the hub.

3. The vehicle wheel of claim 1, wherein the hub includes a cylindrical rotation guide so that the rotating ring is positioned on an external diameter of the cylindrical rotation guide.

4. The vehicle wheel of claim 1, wherein at least one of the rotating blades includes the bent portion formed at an external end portion thereof in a radial direction.

5. The vehicle wheel of claim 4, wherein the bent portion is bent at the external end portion thereof in a circumferential direction of a wheel rim.

6. The vehicle wheel of claim 1, wherein the driving unit further includes a puller returning the opening and closing member rotated by the pushing portion to an original position of the opening and closing member.

7. The vehicle wheel of claim 6, wherein the puller is an elastic member.

8. The vehicle wheel of claim 1, wherein the opening and closing member includes a plurality of rotating blades, and wherein the pushing portion includes a pusher formed of a shape-memory alloy linked to one of the rotating blades to provide the rotational driving force to the opening and closing member.

9. The vehicle wheel of claim 8, wherein the driving unit further includes a puller returning the opening and closing member rotated by the pushing portion to an original position of the opening and closing member.

10. The vehicle wheel of claim 9, wherein the puller is an elastic member.

11. The vehicle wheel of claim 1, wherein the rotating blades are provided to correspond to a shape of the openings.

12. The vehicle wheel of claim 11, wherein the rotating blades include a greater circumferential width than the openings.

13. The vehicle wheel of claim 1, wherein a circular reinforcing ring is provided to connect external end portions of the rotating blades.

14. The vehicle wheel of claim 1, wherein a bearing is mounted between the rotating ring and the hub.

15. A vehicle comprising:

a body; and the vehicle wheel according to claim 1 provided to enable the body to travel.

16. A vehicle wheel comprising:

a wheel disk including a hub, a plurality of spokes extending radially from the hub, and a wheel rim provided on an outside of the spokes;

an opening and closing member controlling opening and closing of openings formed between the spokes; and a driving unit coupled to and rotating the opening and closing member around the hub, wherein the driving unit includes a pushing portion providing a rotational driving force to the opening and closing member, wherein the opening and closing member includes a plurality of rotating blades, and the pushing portion includes a pusher formed of a shape-memory alloy linked to one of the rotating blades to provide the rotational driving force to the opening and closing member, wherein the driving unit further includes a puller returning the opening and closing member rotated by the pushing portion to an original position of the opening and closing member, wherein at least one of the rotating blades includes a rotating rib extending in a radial direction, and wherein one end portion of each of the pushing portion and the puller is connected to the rotating rib.

17. The vehicle wheel of claim 16, wherein one of the spokes includes a fixed rib to which other end portion of each of the pushing portion and the puller are connected.

* * * * *